(12) United States Patent
Burrell

(10) Patent No.: US 9,322,187 B1
(45) Date of Patent: Apr. 26, 2016

(54) SHERPA—A SUPPORTING AND LIFTING APPARATUS AND METHOD

(71) Applicant: Dude Kay Burrell, Rexburg, ID (US)

(72) Inventor: Dude Kay Burrell, Rexburg, ID (US)

( * ) Notice: Subject to any disclaimer, the term of this patent is extended or adjusted under 35 U.S.C. 154(b) by 0 days.

(21) Appl. No.: 14/633,515

(22) Filed: Feb. 27, 2015

(51) Int. Cl.
*E04G 21/14* (2006.01)
*E04G 21/16* (2006.01)

(52) U.S. Cl.
CPC ............ *E04G 21/168* (2013.01); *E04G 21/165* (2013.01)

(58) Field of Classification Search
CPC ... E04G 21/165; E04G 21/167; E04G 21/168; B62D 63/061; B62D 21/14; B60P 1/14; B60P 1/52; B60P 3/00; B60P 7/10; E04B 1/355
USPC ....................... 414/10, 11, 482, 480, 533, 534
See application file for complete search history.

(56) References Cited

U.S. PATENT DOCUMENTS

| | | | | |
|---|---|---|---|---|
| 1,719,197 A * | 7/1929 | Schlothan | ............... | B62B 3/008 254/3 C |
| 2,679,433 A * | 5/1954 | Wasinger | .................. | B60P 1/14 298/19 B |
| 3,954,189 A * | 5/1976 | Sherritt | ..................... | B60P 3/00 414/11 |
| 4,225,280 A * | 9/1980 | Brunet | .................. | B60P 1/6454 414/479 |
| 4,702,662 A * | 10/1987 | Marlett | .................... | B60P 3/122 298/12 |
| 6,474,672 B1 * | 11/2002 | Briscese | .................. | B60G 3/00 280/414.5 |
| 6,869,261 B2 * | 3/2005 | Burke | ....................... | B60P 7/10 410/32 |
| 7,114,784 B1 * | 10/2006 | Blumenstein | ............. | B60P 1/14 298/1 A |
| 7,810,834 B2 * | 10/2010 | Schneider | ............ | B62D 63/061 280/656 |
| 8,776,478 B2 * | 7/2014 | Hovenier | .................. | B66F 9/18 414/12 |
| 2004/0018076 A1 * | 1/2004 | Poindexter | ............ | B60P 1/4414 414/477 |
| 2006/0285958 A1 * | 12/2006 | Wilhelm | .................... | B60P 1/52 414/529 |

\* cited by examiner

*Primary Examiner* — Saul Rodriguez
*Assistant Examiner* — Mark Hageman

(57) ABSTRACT

The Sherpa is the ultimate sheet supporter. It is an apparatus with a method for assembling, supporting, and lifting sheet metal panels and insulation while constructing a pre-engineered steel building that creates a safer and more efficient work environment. It is a two axle trailer base with a telescoping rear extension. An electric winch is used for actuating the support platform between collapsed/travelling and elevated/operating positions. As it lifts the preassembled panel, it supports it without twisting or kinking to a forty-five degree angle where the panel is able to be lifted to a totally vertical position and secured into place.

3 Claims, 4 Drawing Sheets

SHERPA—A SUPPORTING AND LIFTING APPARATUS AND METHOD

CROSS-REFERENCE TO RELATED APPLICATIONS

This is part of a Non-Provisional Utility Patent Application with no prior applications.

STATEMENT REGARDING FEDERALLY SPONSORED RESEARCH OR DEVELOPMENT

This invention was not made with any federally sponsored research or development support so the United States government has no rights in this invention.

REFERENCE TO A "SEQUENCE LISTING", A TABLE, OR A COMPUTER PROGRAM LISTING APPENDIX

There are no materials being submitted separately on a compact disc.

BACKGROUND OF THE INVENTION

In the construction industry, metal buildings consist of a structural steel framing system, which supports a metal roofing system and wall panels. Pre-engineered steel buildings are fabricated off-site, then shipped from the manufacturer to the construction site, where the building is erected by construction personnel. Most steel building erectors are primarily responsible for the actual erection process and not any of the finish work, such as electrical or plumbing. They do install the insulation in the exterior walls and the roof.

Currently, once the steel structure is in place, the panels and insulation are put up separately by hand by 4-5 installers using a man lift (a motorized scaffold characterized by a bucket or platform).

At the bottom of the structure along the foundation is the base channel (a "C" section secured at the foundation to support wall panels as an alternate to base angle). At the top of the wall is the eave strut (a structural piece spanning columns at the edge of a roof). The horizontal steel supports are girts.

To install the insulation and metal wall panels, the layout begins on the ground level and proceeds floor by floor upward until reaching the roof. Double stick tape is applied to the eave strut and the base channel. The insulation is generally 6' wide and cut to fit the length of the panels. The vinyl side of the insulation goes toward the inside of the building, so the fiberglass side faces outward. It is hung vertically by sticking it to the tape.

The metal wall panels are 3' wide and the length depends on the height of the building. A horizontal layout is marked every 3' on the base channel. The panels are pre-drilled for layout on the girt members. A rope hooked to a man lift is clamped onto the top side of the panel and it is raised by one corner to a vertical stance. Once vertical, the panel is installed on the horizontal layout and fastened down with screws on all base, eave and girt lines. This process is repeated with the next panel lapping the first to finish covering the insulation. The lap is stitched together with stitch screws every 2 feet.

Wind is the worst enemy of the steel erector. When installing the wall & roof panels, they can only safely erect when the winds are 10 miles an hour or less. The wind can grab the insulation and the metal panels and whip them around causing damage to the materials as well as injuries to the installers and take considerably more time.

BRIEF SUMMARY OF THE INVENTION

Dude Kay Burrell, owner of Ultimate Steel Erection, contracted for the tallest building his company has done to date—100 feet high. While planning the execution of this job, Kay determined he needed a safer, more efficient way to hang the insulation and metal wall panels. In January 2014 he came up with the idea to build a trailer base and to put a supporting and lifting apparatus on it. His wife named it 'The Sherpa' and by Mar. 1, 2014 Kay had built a prototype and taken it to use on this big job.

The Sherpa allows the crew to transport the metal wall panels to and around the jobsite, assemble the panels and insulation as one complete piece instead of three, and lift them to a 45 degree angle without twisting or kinking the panels.

Since they aren't trying to keep the insulation up while fastening one panel then another, this is more efficient and safer for the crew. The Sherpa also allows the crew to continue to install the pre-assembled panels in winds up to 20 mph, instead of stopping when the wind is at 10 mph. This cuts down on days when work would normally be called off due to wind.

DETAILED DESCRIPTION OF THE INVENTION

The invention will now be described in further detail by reference to the accompanying drawings. It is to be understood that the particularity of the drawings does not supersede the generality of the preceding description of the invention.

The Sherpa is a supporting and lifting apparatus mounted on a trailer base with adjustable extensions that support the metal wall panels while they are assembled to the insulation and then raised, without getting twisted or kinked, for installation onto the steel building structure.

Figure 1:
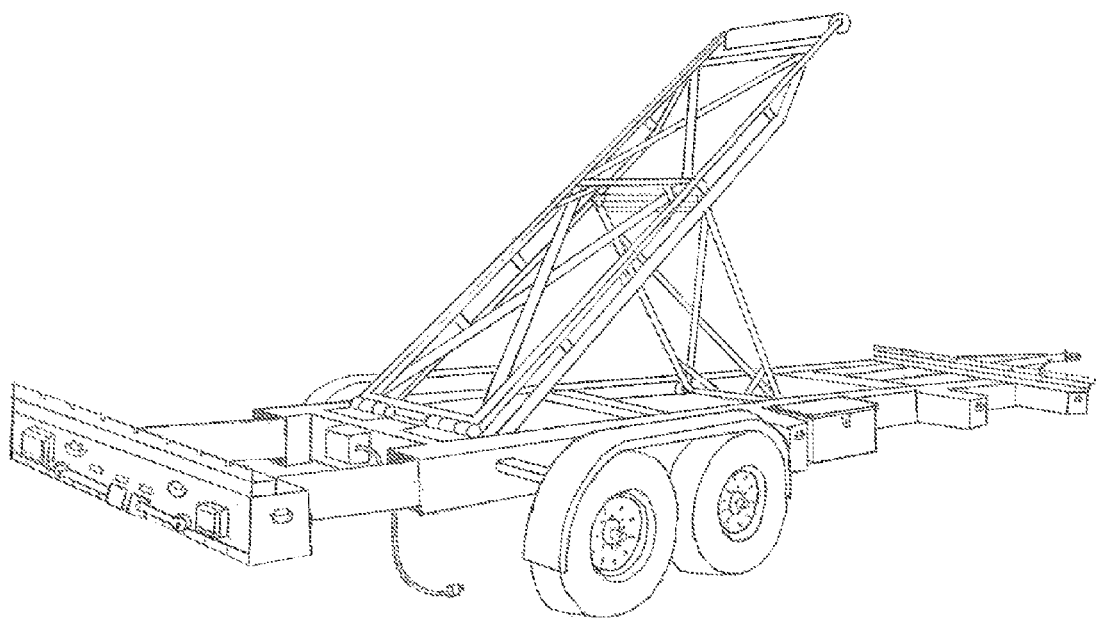
FIG. 1—Shows a rear, side, top view of the supporting and lifting apparatus mounted on a trailer base with the rear extension partially extended.
Figure 2:
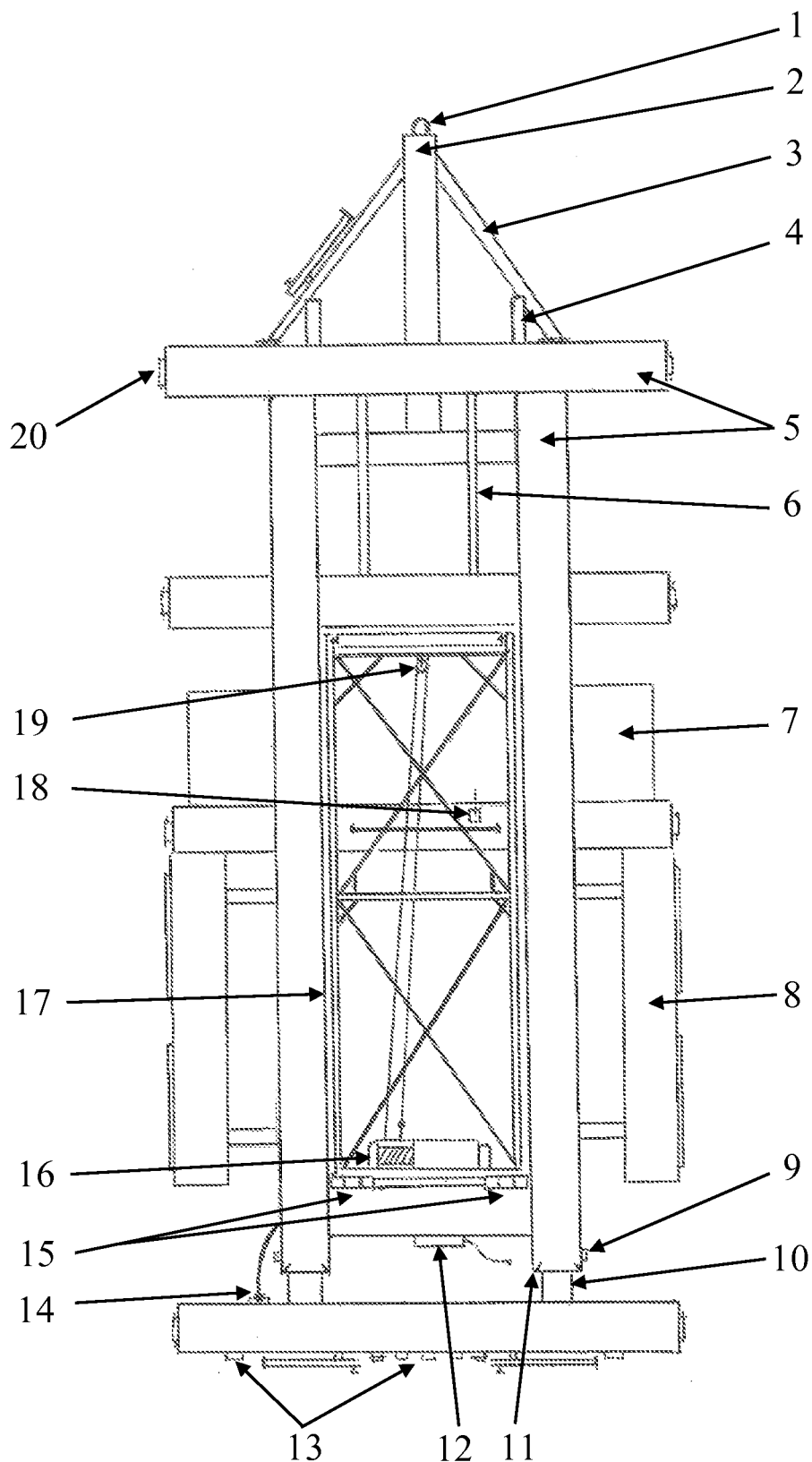
FIG. 2—Shows a simplified overhead view of the supporting and lifting apparatus with the supporting platform retracted in a collapsed/transport position and the extensions barely extended.

Assembling the trailer base with a supporting and lifting apparatus is as follows:

FIG. 2 shows 10" square steel tubing 5 cut and welded to make the trailer skeleton 8' wide and 25' long. The hitch assembly 2 is 6" steel tubing cut and welded to the front of the trailer skeleton in a T shape with an adjustable hitch 1 welded to the front end of it adding another 5 feet to the length of the trailer. Two pieces of 4" steel tubing 3 were welded in between the skeleton and the hitch for support. Two pieces of flat 4" steel 6 were welded inside the front of the skeleton for support.

FIG. 2 also shows two brackets 4 for holding the spreader bars or other materials, two lockable toolboxes 7 were attached with screws, one on each side about in the middle of the trailer skeleton. Steel fenders 8 were welded on each side towards the back of the trailer skeleton, behind the toolboxes, and extended out from the trailer skeleton. Twelve D-rings 20 were attached to the trailer skeleton tubing; four on each side, two on front, and two on rear to allow for transporting sheets and/or other ancillary materials.

Figure 3:
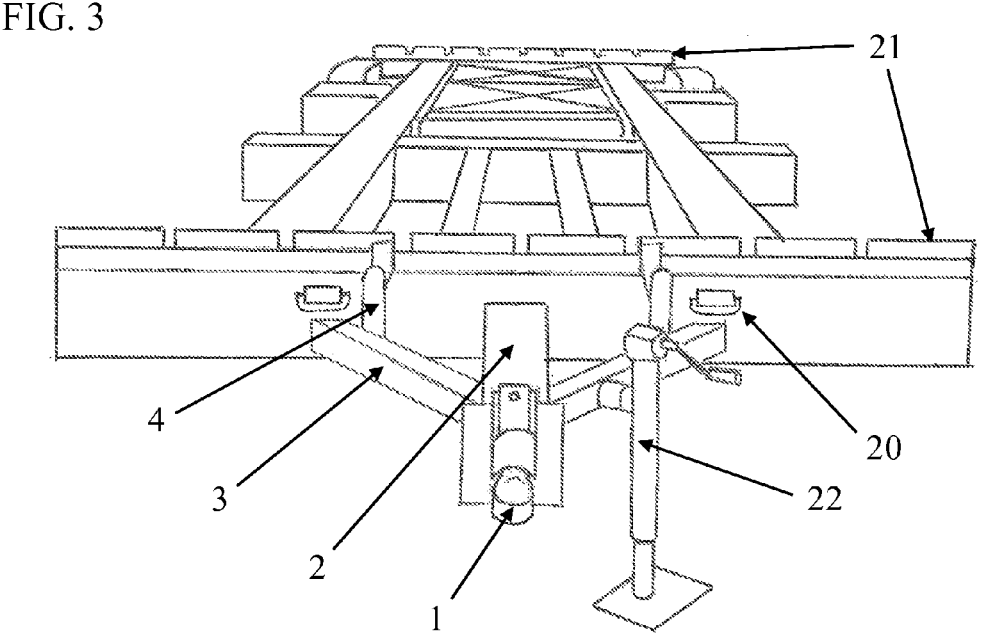
FIG. 3—Shows a simplified front, top view of the supporting and lifting apparatus trailer base with one adjustable trailer hitch, one trailer jack and two d-rings attached.

FIG. 3 shows one 8 foot steel guide 21 was welded to the top of the front and the rear skeletal tubing with notches cut out to match up with the shape of the metal wall panels. FIG. 3 also shows a trailer jack 22, an adjustable trailer hitch 1 welded onto the front hitch assembly 2, and the support tubing 3. Two D-rings 20 and two brackets 4 were welded on the front of the trailer skeleton.

Figure 4:
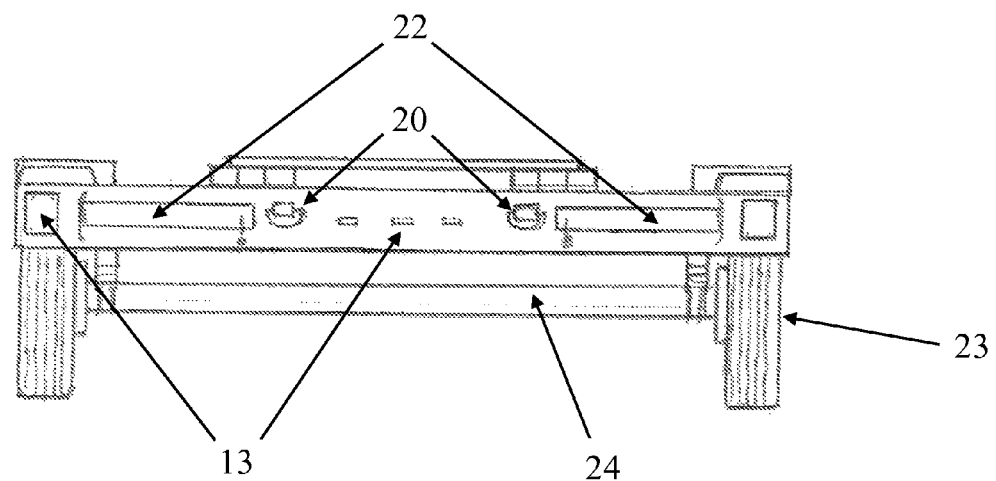
FIG. 4—Shows a simplified view of the rear of the supporting and lifting apparatus trailer base with two trailer jacks, two d-rings and trailer lights attached to the extension.

FIG. 4 shows the rear axle 24 attached to the trailer skeleton. There is another set right in front of it. Two sets of wheels and tires 23 were added. FIG. 4 also shows two more trailer jacks 22 and two more D-rings 20 were welded onto the back of the trailer extension. Trailer lights 13 were later attached to the back of the trailer extension.

In FIG. 2, inside both of the long 10" steel tubes 5 there is 20' of thick 6" round pipe 10. The pipes are welded at the rear end to the 10" piece of square steel tubing 5 that is the back of the trailer skeleton. The pipes slide in and out of the trailer skeleton square tubing to make two telescoping extensions. The pipes roll between hard rubber wheels 11 attached to all four corners at intervals along the inside of the steel tubing 5. Not only do the wheels facilitate pulling out the extensions, but they also stabilize the extensions while being transported. There are 1" bolts 9 on each side of the tubing where the extensions roll out that can be tightened to lock the extensions in place. Before extending out the extensions, the trailer lights plug 14 need to be unplugged.

Figure 5:
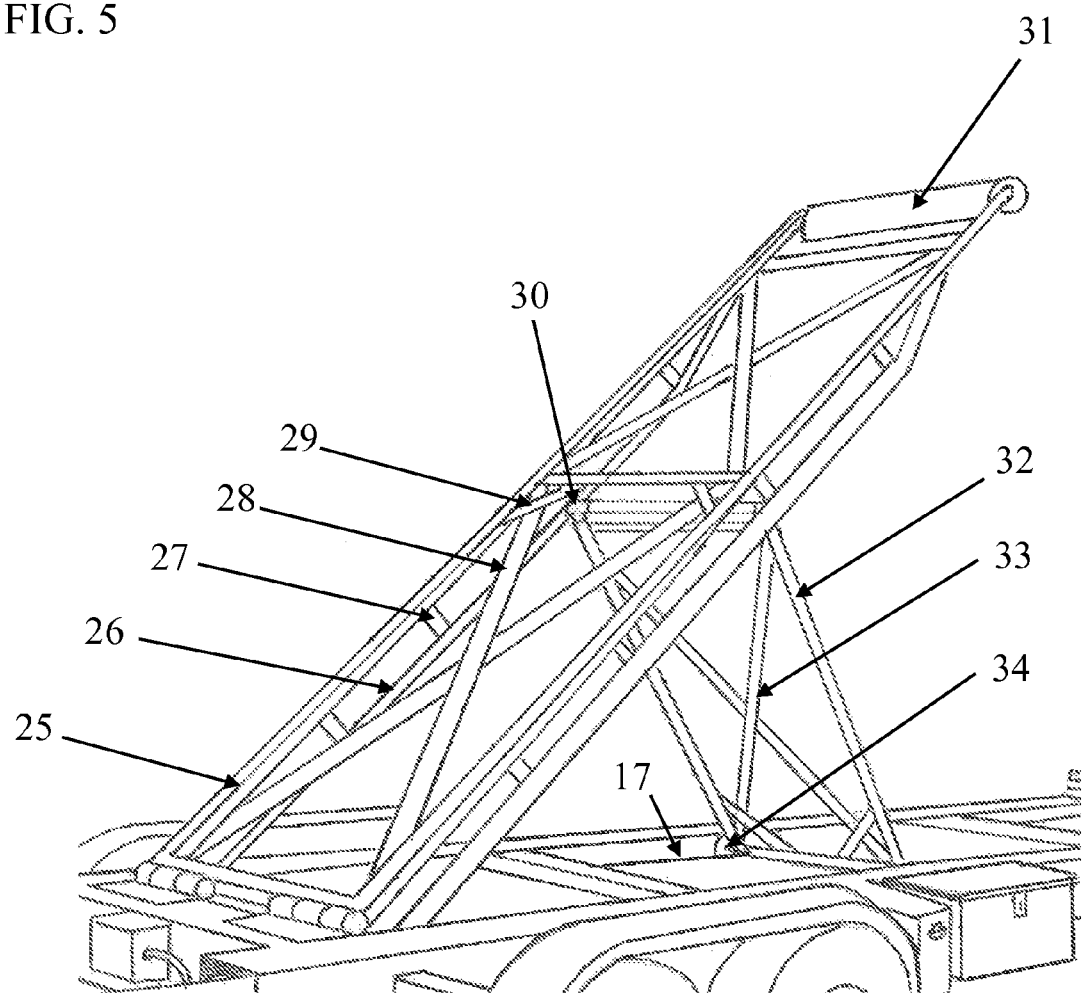
FIG. 5—Shows a simplified rear, side view of the supporting and lifting apparatus in an upright position.

As shown in FIG. 5, the supporting apparatus was constructed of square steel tubing 25 cut and welded together in a rectangle with a middle crossbar. Beneath the steel tubing rectangle 25 another row of steel tubing 26 was attached with more steel tubing 27 welded every few feet for support. Angle iron 28 was welded in an X inside both sides of the rectangle of square tubing and flat iron was welded as corner braces 29. At the top of the supporting apparatus is a long plastic roller 31 which rotates beneath the panels as the support is raised.

In FIG. 2, it shows an electric winch 16 was attached to the inside of the apparatus skeleton at the rear beneath the bottom end of the supporting apparatus. Two long hardened steel pins were attached to the trailer skeleton & supporting apparatus on either side of the winch as hinge pins 15. Along the inside of the trailer skeleton where the supporting and lifting apparatus fits, angle iron has been welded 17 which acts as a support to hold the supporting and lifting apparatus in place when it is down and traveling. Across from the winch on the inside of the front end of the apparatus skeleton, a snatch block 19 was attached. The winch is rigged using this snatch block as a double-line pull. This doubles the pulling power of the winch and cuts the line speed in half.

FIG. 5 shows the supporting apparatus in a raised position. The lifting support 32 was constructed of a steel tubing rectangle with angle iron crossing in an x for support 33. At the top of the lifting support are two pins 30 which rotate to allow the two steel wheels 34 attached at the bottom of the support to move from the rear to the front and back again along the angle guides 17. As the winch pulls in, the bottom of the lifting support 32 is pulled away from the winch, thereby raising the supporting apparatus.

In FIG. 2, the electric winch 16 requires a 240 volt power source. It has an electric limit switch 18 that is mounted to the trailer skeleton under the supporting and lifting apparatus to stop the lift up at 45 degrees. The wiring 12 for the electric winch 16 and the trailer lighting 13 was attached to the rear mid-rail tubing.

This supporting and lifting apparatus on a trailer base was powder coated black.

To use the Sherpa, it is transported to the job site via the trailer hitch attached to a company vehicle. It is not attached to the vehicle while in operation. It uses the three trailer jacks for stability.

A crew of 5 is used to safely and efficiently operate the Sherpa including: 2 assemblers, 2 installers & 1 boom operator.

Once the trailer is set up and extended to the length of the metal wall panels, the insulation is rolled out on it vertically, vinyl side down. Two metal panels are laid on top of the insulation and lap stitched together. The insulation is cut a few inches bigger than the panels, the excess fiberglass insulation is cut to the edge of the panel, and the remaining vinyl is rolled over to create a protected edge.

The insulation is attached to the back side of the metal panels, with backers at the top and the base, with lathe screws thru the high ribs. Three holes are drilled into the backers—a few inches down from the top, one inch in from each side and one in the center. A spreader bar is hooked to the panels with carabiners clipped thru the holes and attached to the hook on the boom truck. Tag lines are attached at each bottom corner of the assembled wall panel, making it ready to hoist into position.

Due to the weight of the assembled panel, picking it up flat runs the risk of twisting or kinking it. The center of the assembled panel is supported by the trailer supporting apparatus until it reaches a 45 degree angle, at which time the assembled wall panel is able to be lifted to a totally vertical position and moved into place.

One installer rides in the boom lift as the boom truck operator hoists the assembled panel. The assemblers each control a tag line to stabilize the assembled panel as it is moved into place. The other installer controls the winch on the supporting and lifting apparatus.

The installers then fasten the assembled panel at the bottom and top—across the base channel and eve struts—using self-drilling screws in the flats. The assembled panel is completely secured to the girts every foot in the flats throughout the panel or as per engineering specifications.

While the installers are securing the panel, the assemblers are prepping the next assembled panel on the supporting and lifting apparatus.

The Sherpa has been working very well since being put on the job. The crew has been able to work safer, more efficiently and in stronger wind conditions.

While in order to comply, the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A supporting and lifting apparatus mounted on a trailer base with adjustable extensions, capable of being towed by a towing vehicle and used to transport materials on a work site which are intended to be assembled, supported and lifted vertically for installation, comprising:
- an expandable, rigid, rectangular trailer base frame;
- a supporting and lifting apparatus mounted on the trailer base frame;
- said trailer base frame being divided into a front frame portion and a rear frame portion;
- said front frame portion including a pair of parallel, hollow, longitudinal side members and at least three parallel, laterally disposed members connected to said longitudinal side members;
- said front frame portion having attached a first and second forward member angularly together at the front end forming an apex and connected to the front end of the said longitudinal side members at their opposite ends;
- a trailer hitch assembly with a tongue extending from said apex of front of said front frame portion configured for coupling said trailer base frame to a conventional vehicle or truck for towing;
- a trailer jack attached to said apex for support when said rear frame portion is extended;
- at least one axle attached to the rear of the said front frame portion of said trailer base;
- at least one pair of wheels attached to each said axle;
- a fender mounted on said front frame portion over each side of said pair of wheels;
- said rear frame portion is an extension comprising a laterally disposed member attached to a pair of longitudinal pipes which is movable rearwardly extending telescopically out of said longitudinal members on said front frame portion to adjust to the length of the materials;
- said pair of longitudinal pipes roll inside said longitudinal members on said front frame portion between wheels attached in all four corners at intervals to support said pair of longitudinal pipes while telescoping out while operating said supporting and lifting apparatus or while being pushed back in to be transported;
- a securing mechanism mounted on rear end of said front frame portion of said trailer base configured to selectively secure said extension in place during periods of operating said supporting and lifting apparatus or while traveling, such that movement of said support and lifting apparatus between operating and transport positions does not take place when the securing mechanism is engaged;
- when said rear frame portion is extended, trailer jacks attached to said rear frame are used to support said rear frame;
- said laterally disposed member encloses braking and electrical system of said supporting and lifting apparatus mounted on a trailer base;
- wherein the frame further comprises a storage compartment disposed on each side of the said front frame just in front of fenders for storing materials.

2. The supporting and lifting apparatus mounted on a trailer base with adjustable extensions, according to claim #1, wherein said supporting and lifting apparatus is mounted directly to the said trailer base being attached to support members on the inside of said longitudinal side members and nestled flush with top of said front frame, comprising:
- a rectangular supporting apparatus constructed of two pair of connected double rows of rigid rectangles and supporting cross beams;
- a support apparatus rigidly connected to said trailer base frame wherein the support frame includes a pair of support members spaced opposite from one another;
- and pivotal therewith between the substantially horizontal position and the inclined position;
- wherein the inclined position is a substantially vertical position;
- a rear end of said rectangular supporting apparatus hinged to said laterally disposed member toward the rear of said front frame portion of said trailer base;
- a front end of said rectangular supporting apparatus attached to a roller, which rotates beneath the materials as said rectangular supporting apparatus is raised;
- a mid to front end of said rectangular supporting apparatus connected to said rear end of said lifting apparatus.

3. The supporting and lifting apparatus mounted on a trailer base with adjustable extensions, according to claim #1, wherein said supporting and lifting apparatus is mounted directly to said trailer base being attached to support members on the inside of said pair of longitudinal side members and nestled flush with top of said front frame, the lifting apparatus comprising:
- a rigid rectangle with cross braces, resting on said support members directly beneath a support apparatus inside of said longitudinal side members;
- said lifting apparatus connected to the support apparatus and slidable between a first elevated/operating position and a second collapsed/traveling position relative to said support apparatus, said lifting apparatus being substantially vertical when in the elevated position and said lifting apparatus being substantially horizontal when in the collapsed position;
- said lifting apparatus is pinned on front end to the middle of said supporting apparatus and the rear end includes a pair of rollers connected to each of a first side and a second side of said lifting apparatus, said first and second sides being opposite sides of said lifting apparatus, each pair of said rollers engaging said support members on the trailer base when said lifting apparatus is in the elevated position and neither pair of the rollers engaging said support members when in the collapsed position;
- said lifting apparatus using an electric winch and a snatch block to actuate in a reciprocating motion said lifting apparatus with said support apparatus and facilitate movement of the supporting apparatus between the elevated and collapsed positions thereof;
- said lifting apparatus in the horizontal position allowing the support apparatus to have materials loaded and assembled, then elevating said supporting apparatus into the elevated, vertical position, allowing the assembled materials to be unloaded in a vertical position for installation to the worksite surface.

* * * * *